United States Patent
Moon et al.

(10) Patent No.: US 11,670,259 B2
(45) Date of Patent: *Jun. 6, 2023

(54) ELECTRONIC DEVICE CONTROLLING LUMINANCE AND METHOD FOR CONTROLLING LUMINANCE THEREOF

(71) Applicant: SAMSUNG ELECTRONICS CO., LTD., Suwon-si (KR)

(72) Inventors: Soohyun Moon, Suwon-si (KR); Kyoungmin Park, Suwon-si (KR); Minsu Kim, Suwon-si (KR); Keehyon Park, Suwon-si (KR); Dongheon Shin, Suwon-si (KR); Hearyun Jung, Suwon-si (KR); Dongkyoon Han, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/841,719

(22) Filed: Jun. 16, 2022

(65) Prior Publication Data

US 2022/0310036 A1 Sep. 29, 2022

Related U.S. Application Data

(63) Continuation of application No. 16/985,560, filed on Aug. 5, 2020, now Pat. No. 11,386,868.

(30) Foreign Application Priority Data

Aug. 7, 2019 (KR) .................. 10-2019-0096212

(51) Int. Cl.
*G09G 5/10* (2006.01)
(52) U.S. Cl.
CPC ......... *G09G 5/10* (2013.01); *G09G 2320/046* (2013.01); *G09G 2320/0626* (2013.01);
(Continued)

(58) Field of Classification Search
CPC ............... G09G 5/10; G09G 2320/046; G09G 2320/0626; G09G 2330/022;
(Continued)

(56) References Cited

U.S. PATENT DOCUMENTS 7,050,037 B1 5/2006 Kuramatsu
7,580,031 B2 8/2009 Plut
(Continued)

FOREIGN PATENT DOCUMENTS

JP 2007-104059 4/2007
KR 10-2014-0042578 4/2014
(Continued)

OTHER PUBLICATIONS

U.S. Appl. No. 16/985,560, filed Aug. 5, 2020; Moon et al.
(Continued)

*Primary Examiner* — Rodney Amadiz
(74) *Attorney, Agent, or Firm* — Nixon & Vanderhye P.C.

(57) ABSTRACT

An electronic device includes: a display device, a processor operatively connected to the display device, and a memory operatively connected to the processor. The memory stores one or more instructions that when executed, cause the processor to: determine, as a second screen code value, a code value obtained by reducing a first screen code value corresponding to a luminance value of a screen of the display device by a decrement based on the screen being maintained in a turned on state during a first specific time after a screen-off condition of the display device is satisfied, and change the luminance value of the screen to correspond to the determined second screen code value.

20 Claims, 10 Drawing Sheets

(52) U.S. Cl.
CPC . *G09G 2330/022* (2013.01); *G09G 2330/023* (2013.01); *G09G 2370/022* (2013.01); *G09G 2370/16* (2013.01)

(58) Field of Classification Search
CPC ....... G09G 2330/023; G09G 2370/022; G09G 2370/16; G09G 2330/021; G09G 3/2007; G09G 3/3406; G09G 2360/12; G09G 2360/14
See application file for complete search history.

(56) References Cited

U.S. PATENT DOCUMENTS

| | | |
|---|---|---|
| 7,580,033 B2 | 8/2009 | Plut |
| 8,487,918 B1 | 7/2013 | Nelissen et al. |
| 8,723,854 B2 | 5/2014 | Lu |
| 9,035,974 B2 | 5/2015 | Choi et al. |
| 9,135,884 B2 | 9/2015 | Plut |
| 9,424,804 B2 | 8/2016 | Jung et al. |
| 11,386,868 B2 * | 7/2022 | Moon ..................... G09G 5/10 |
| 2003/0071805 A1 | 4/2003 | Stanley |
| 2004/0155854 A1 | 8/2004 | Ma |
| 2005/0270265 A1 | 12/2005 | Plut |
| 2006/0020906 A1 | 1/2006 | Plut |
| 2009/0160541 A1 | 6/2009 | Liu |
| 2010/0141635 A1 | 6/2010 | Plut |
| 2011/0037781 A1 | 2/2011 | Kangas |
| 2014/0022223 A1 | 1/2014 | Jung |
| 2014/0139557 A1 | 5/2014 | Choi et al. |
| 2016/0291681 A1 | 10/2016 | Worthington |
| 2017/0147063 A1 | 5/2017 | Lim |
| 2017/0148390 A1 | 5/2017 | Park |
| 2018/0122300 A1 | 5/2018 | Jang |
| 2018/0158420 A1 | 6/2018 | Worthington |
| 2019/0005894 A1 | 1/2019 | Nelissen et al. |

FOREIGN PATENT DOCUMENTS

| | | |
|---|---|---|
| KR | 10-2016-0134612 | 11/2016 |
| KR | 10-2018-0018971 | 2/2018 |
| KR | 10-2018-0054993 | 5/2018 |

OTHER PUBLICATIONS

Extended European Search Report dated May 30, 2022 for EP Application No. 20849883.2.
International Search Report dated Nov. 30, 2020 in corresponding International Application No. PCT/KR2020/010253.

* cited by examiner

|  | RANGE | C |
|---|---|---|
| FIRST SCREEN CODE VALUE | 110 ~ 118 | 10% |
| | 119 ~ 133 | 15% |
| | 134 ~ 255 | 20% |

FIG.7

ELECTRONIC DEVICE CONTROLLING LUMINANCE AND METHOD FOR CONTROLLING LUMINANCE THEREOF

CROSS-REFERENCE TO RELATED APPLICATION

This application is a Continuation of U.S. application Ser. No. 16/985,560, filed Aug. 5, 2020, which claims priority to KR 10-2019-0096212, filed on Aug. 7, 2019, the entire contents of which are all hereby incorporated herein by reference in their entireties.

BACKGROUND

Field

The disclosure relates to a technology of adjusting luminance of a screen on a display panel.

Description of Related Art

An electronic device may include a display module including a display panel including a screen and a display driver integrated circuit (DDI) to drive the display panel, and at least one processor. The at least one processor provides image data including luminance data to the DDI such that the display panel displays the screen having a set luminance. The DDI displays the screen based on the luminance corresponding to the luminance data.

The electronic device mays perform dimming for the screen or turn off the screen when a specific condition is satisfied depending on the settings of the electronic device or the settings by a user, thereby reducing power consumption of the electronic device. However, the electronic device may maintain the screen in a turned on state, in response to the requests of applications, depending on the applications of the electronic device.

Even though the electronic device maintains the screen in a turned on state, in response to the request of the application executed on the electronic device, the controlling of the luminance of the screen is necessary to reduce power consumption of the electronic device, to prevent and/or reduce the burn-in of a display, and to protect the eyesight of the user.

The above information is presented as background information only to assist with an understanding of the disclosure. No determination has been made, and no assertion is made, as to whether any of the above might be applicable as prior art with regard to the disclosure.

SUMMARY

Embodiments of the disclosure address at least the above-mentioned problems and/or disadvantages and provide at least the advantages described below. Accordingly, embodiments of the disclosure provide an electronic device to address the above problems and to address the issues raised herein.

Embodiments of the disclosure provide an electronic device that reduces the power consumption of the electronic device, to prevent and/or reduce burn-in of the display, and to protect the eyesight of the user, by controlling the luminance of the screen, even though the electronic device maintains the screen in a turned on state, in response to the request of the application running on the electronic device.

In accordance an example embodiment of the disclosure, an electronic device may include: a display device, a processor operatively connected to the display device, and a memory operatively connected with the processor. The memory stores one or more instructions that when executed, cause the processor to: determine, as a second screen code value, a code value obtained by reducing a first screen code value corresponding to a luminance value of a screen by a decrement based on the screen being maintained in a turned on state during a first specific time after a screen-off condition of the display device is satisfied, and change the luminance value of the screen to correspond to the determined second screen code value.

In accordance with another example embodiment of the disclosure, a method for controlling luminance of a screen of an electronic device includes: determining, as a second screen code value, a code value obtained by reducing a first screen code value corresponding to a luminance value of a screen, by a decrement based on the screen being maintained in a turned on state during a first specific time after a screen-off condition is satisfied; and changing the luminance value of the screen to correspond to the determined second screen code value.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the present disclosure will be more apparent from the following detailed description, taken in conjunction with the accompanying drawings, in which:

FIG. 7 is a table illustrating an example maximum decrement for each screen code value for setting luminance of a screen of an electronic device, according to various embodiments;

In the following description made with respect to the accompanying drawings, similar components will be assigned with similar reference numerals.

DETAILED DESCRIPTION

Hereinafter, various example embodiments of the disclosure may be described with reference to accompanying drawings. However, those of ordinary skill in the art will understand that the disclosure is not limited to a specific embodiment, and that various modifications, equivalents, and/or alternatives on the various example embodiments described herein can be variously made without departing from the scope and spirit of the disclosure.

Hereinafter, an example configuration of an electronic device will be described with reference to FIGS. 1 and 2, according to an embodiment.

Figure 1:
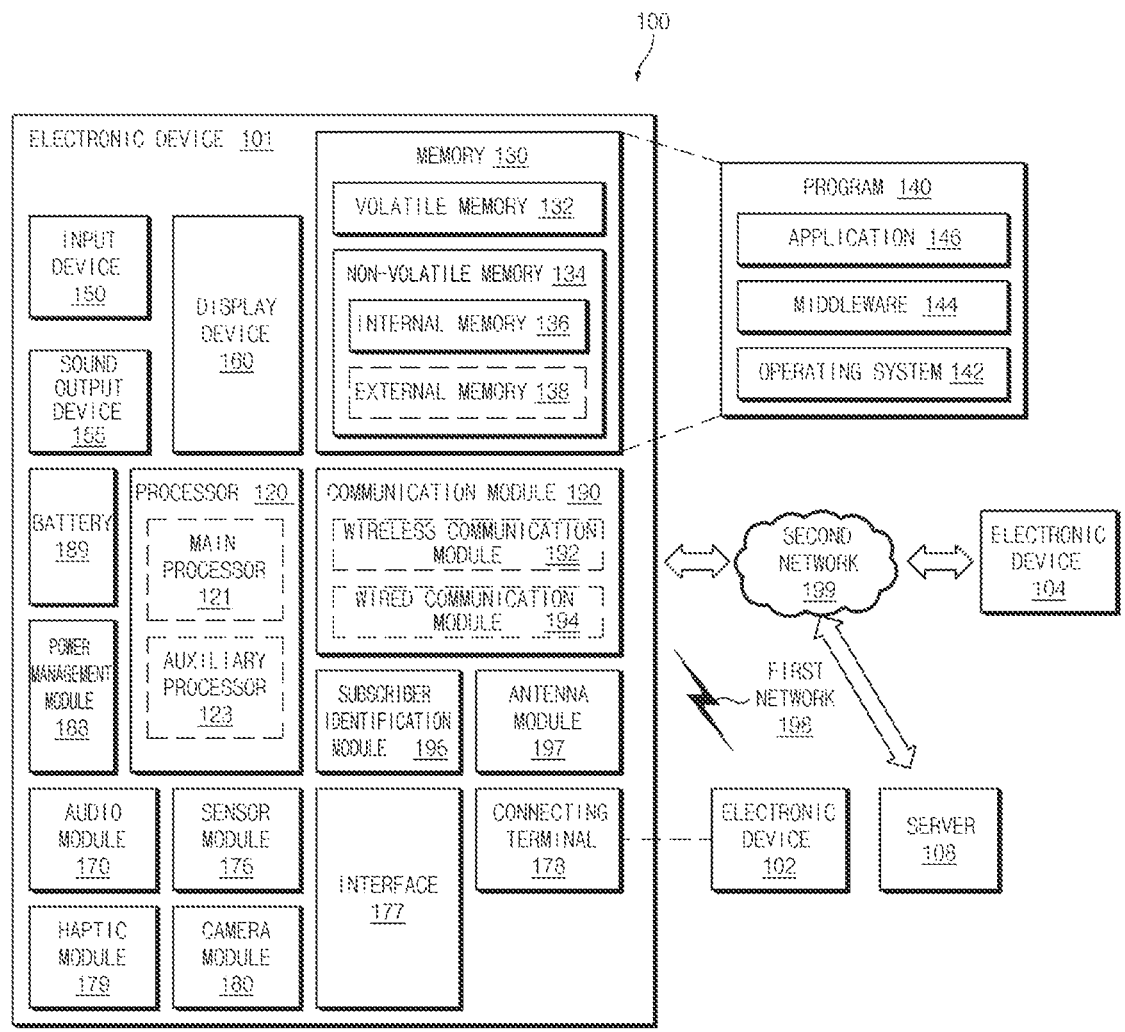
FIG. 1 is a block diagram illustrating an example electronic device in a network environment, according to various embodiments.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an example embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an example embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may include, for example, one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to au embodiment, the module may be implemented in a form of au application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by au interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
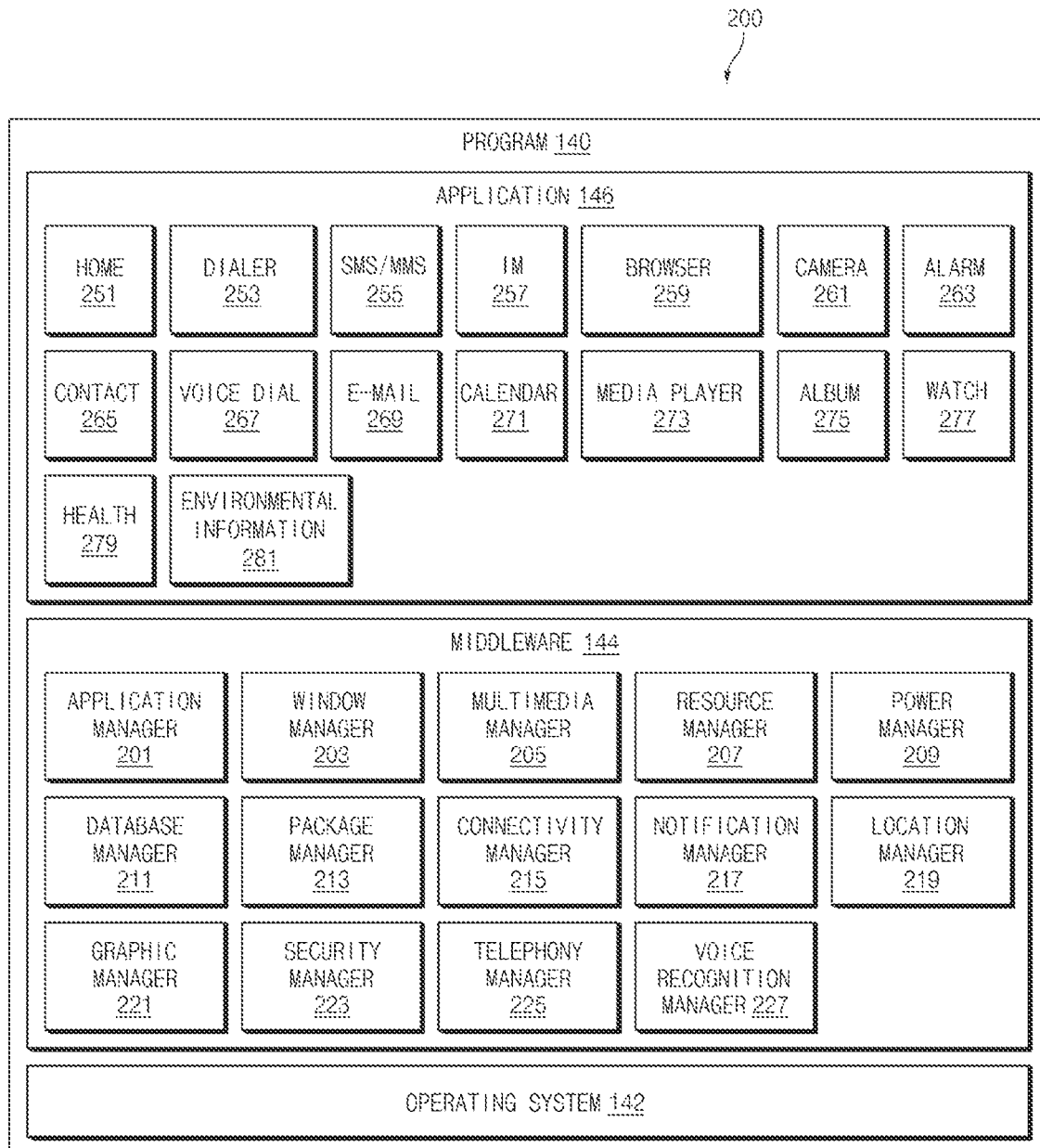
FIG. 2 is a block diagram illustrating an example program included in a memory of the electronic device of FIG. 1, according to various embodiments.

FIG. 2 is a block diagram 200 illustrating the program 140 according various embodiments. According to an embodiment, the program 140 may include an operating system (OS) 142 to control one or more resources of the electronic device 101, middleware 144, or an application 146 executable in the OS 142. The OS 142 may include, for example, Android™, iOS™, Windows™, Symbian™, Tizen™, or Bada™. At least part of the program 140, for example, may be pre-loaded on the electronic device 101 during manufacture, or may be downloaded from or updated by an external electronic device (e.g., the electronic device 102 or 104, or the server 108) during se by a user.

The OS 142 may control management (e.g., allocating or deallocation) of one or more system resources (e.g., process, memory, or power source) of the electronic device 101. The OS 142, additionally or alternatively, may include one or more driver programs to drive other hardware devices of the electronic device 101, for example, the input device 150, the sound output device 155, the display device 160, the audio module 170, the sensor module 176, the interface 177, the haptic module 179, the camera module 180, the power management module 188, the battery 189, the communication module 190, the subscriber identification module 196, or the antenna module 197.

The middleware 144 may provide various functions to the application 146 such that a function or information provided from one or more resources of the electronic device 101 may be used by the application 146. The middleware 144 may include, for example, an application manager 201, a window manager 203, a multimedia manager 205, a resource manager 207, a power manager 209, a database manager 211, a package manager 213, a connectivity manager 215, a notification manager 217, a location manager 219, a graphic manager 221, a security manager 223, a telephony manager 225, and/or a voice recognition manager 227.

The application manager 201, for example, may manage the life cycle of the application 146. The window manager 203, for example, may manage one or more graphical user interface (GUI) resources that are used on a screen. The multimedia manager 205, for example, may identify one or more formats to be used to play media files, and may encode or decode a corresponding one of the media files using a codec appropriate for a corresponding format selected from the one or more formats. The resource manager 207, for example, may manage the source code of the application 146 or a memory space of the memory 130. The power manager 209, for example, may manage the capacity, temperature, or power of the battery 189, and determine or provide related information to be used for the operation of the electronic device 101 based at least in part on corresponding information of the capacity, temperature, or power of the battery 189. According to an embodiment, the power manager 209 may interwork with a basic input/output system (BIOS) (not shown) of the electronic device 101.

The database manager 211, for example, may generate, search, or change a database to be used by the application 146. The package manager 213, for example, may manage installation or update of an application that is distributed in the form of a package file. The connectivity manager 215, for example, may manage a wireless connection or a direct connection between the electronic device 101 and the external electronic device. The notification manager 217, for example, may provide a function to notify a user of an occurrence of a specified event (e.g., an incoming call, message, or alert). The location manager 219, for example, may manage locational information on the electronic device 101. The graphic manager 221, for example, may manage one or more graphic effects to be offered to a user or a user interface related to the one or more graphic effects.

The security manager 223, for example, may provide system security or user authentication. The telephony manager 225, for example, may manage a voice call function or a video call function provided by the electronic device 101. The voice recognition manager 227, for example, may transmit a user's voice data to the server 108, and receive, from the server 108, a command corresponding to a function to be executed on the electronic device 101 based at least in part on the voice data, or text data converted based at least in part on the voice data. According to an embodiment, the middleware 244 may dynamically delete some existing components or add new components. According to an embodiment, at least part of the middleware 144 may be included as part of the OS 142 or may be implemented as another software separate from the OS 142.

The application 146 may include, for example, a home 251, dialer 253, short message service (SMS)/multimedia messaging service (MMS) 255, instant message (IM) 257, browser 259, camera 261, alarm 263, contact 265, voice dial 267, email 269, calendar 271, media player 273, album 275, watch 277, health 279 (e.g., for measuring the degree of workout or biometric information, such as blood sugar), or environmental information 281 (e.g., for measuring air pressure, humidity, or temperature information) application. According to an embodiment, the application 146 may further include an information exchanging application (not shown) that is capable of supporting information exchange between the electronic device 101 and the external electronic device. The information exchange application, for example, may include a notification relay application adapted to transfer designated information (e.g., a call, message, or alert) to the external electronic device or a device management application adapted to manage the external electronic device. The notification relay application may transfer notification information corresponding to an occurrence of a specified event (e.g., receipt of an email) at another application (e.g., the email application 269) of the electronic device 101 to the external electronic device. Additionally or alternatively, the notification relay application may receive notification information from the external electronic device and provide the notification information to a user of the electronic device 101.

The device management application may control the power (e.g., turn-on or turn-off) or the function (e.g., adjustment of brightness, resolution, or focus) of the external electronic device or some component thereof (e.g., a display device or a camera module of the external electronic device). The device management application, additionally or alternatively, may support installation, delete, or update of an application running on the external electronic device.

Hereinafter, example operation of the electronic device will be described with reference to FIGS. 3, 4, 5, 6, 7 and 8, according to an embodiment.

Figure 3:
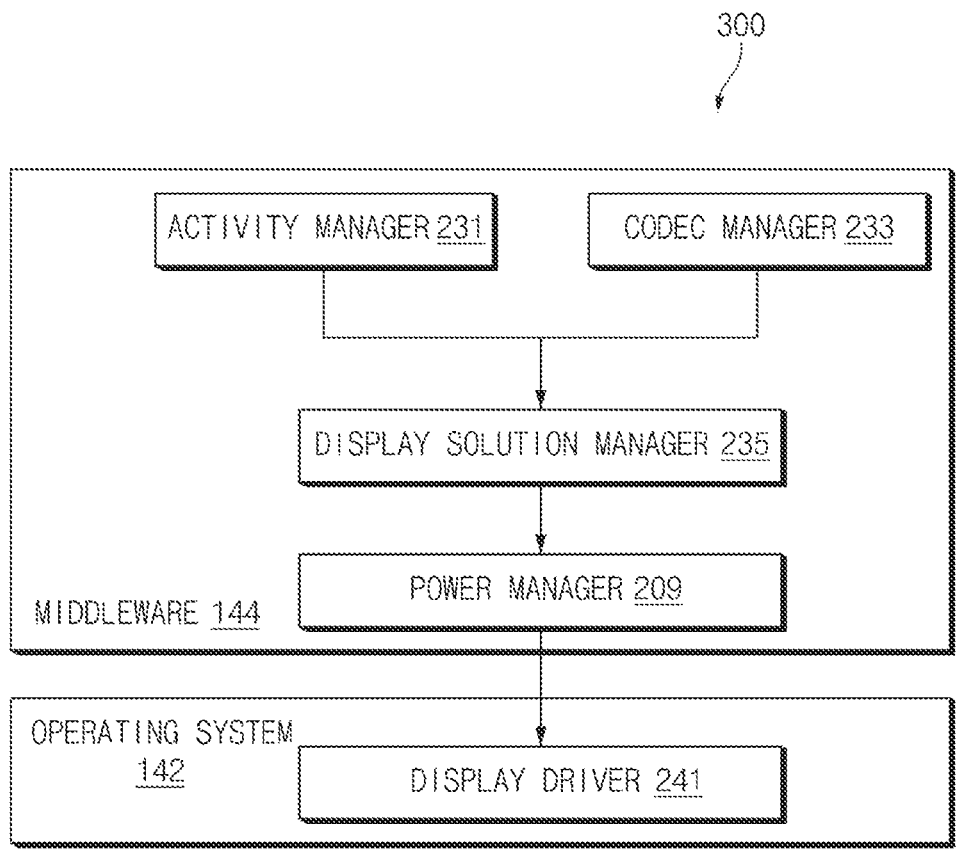
FIG. 3 is a block diagram illustrating a portion of an example program included in a memory of the electronic device of FIG. 1, according to various embodiments.
Figure 4:
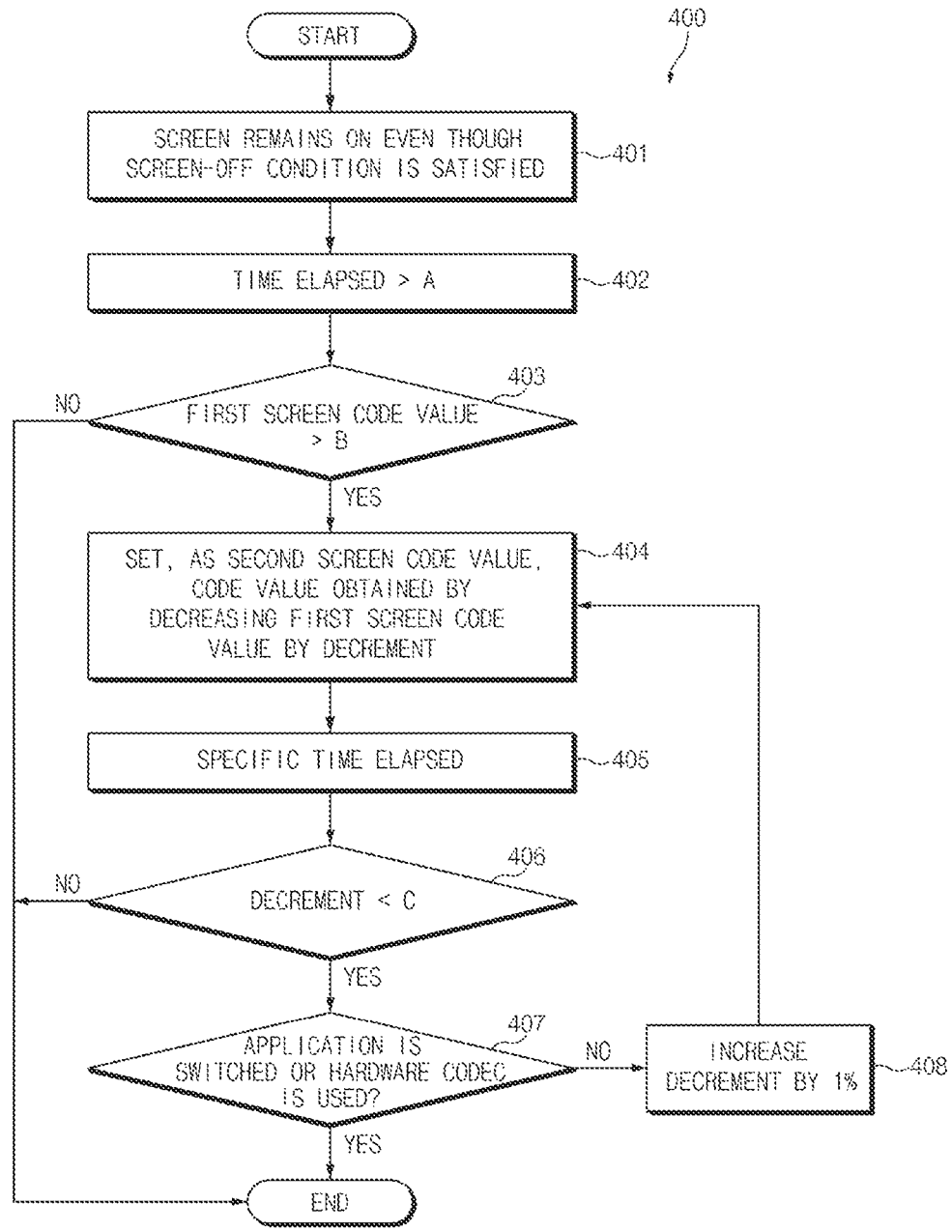
FIG. 4 is a flowchart illustrating an example operation of an electronic device, according to various embodiments.
Figure 5:
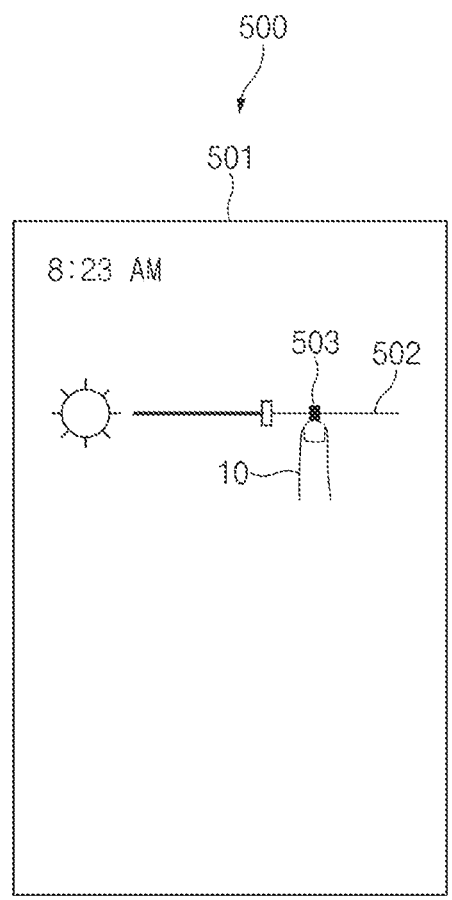
FIG. 5 is a diagram illustrating an example screen of a display panel of an electronic device, according to various embodiments.
Figure 6:
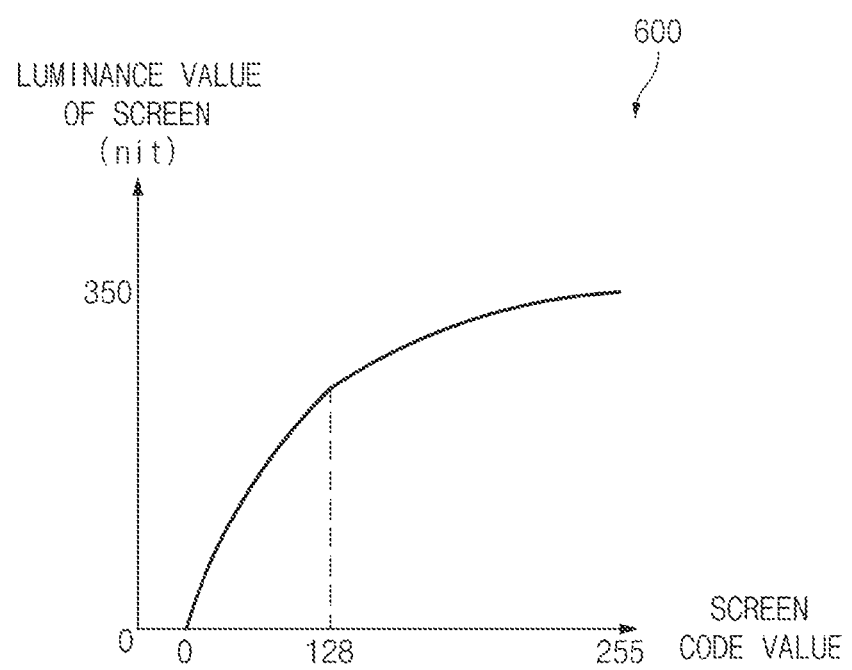
FIG. 6 is a graph mapping a luminance value of a screen of an electronic device to a code value, according to various embodiments.
Figure 8:
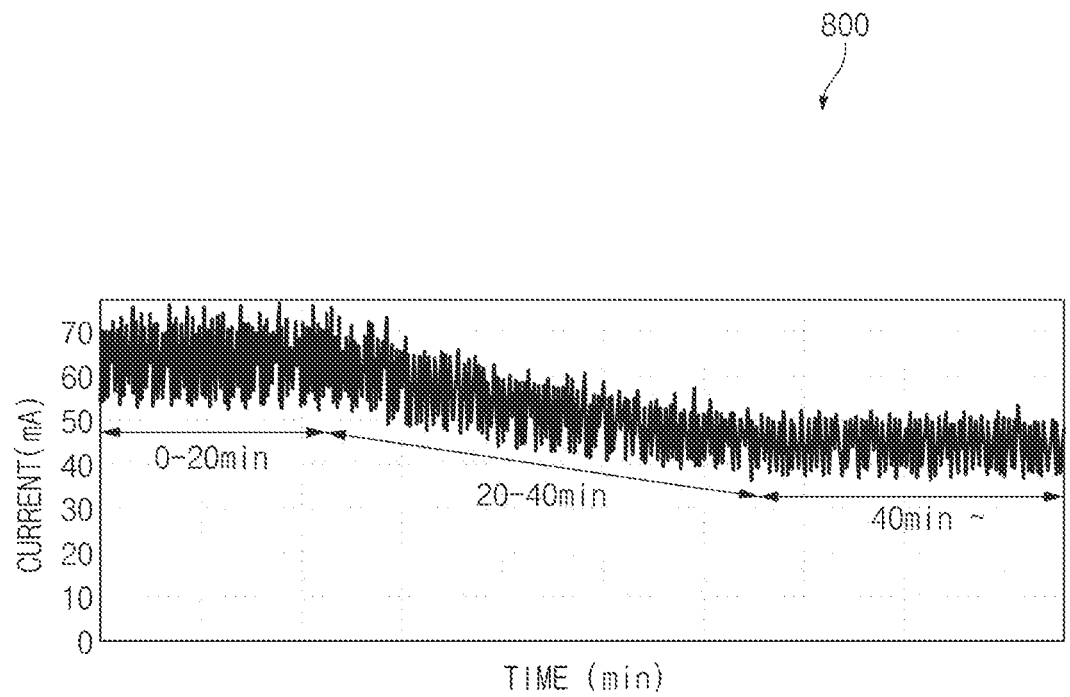
FIG. 8 is a graph illustrating example power consumption when executing a process to control luminance of a screen of an electronic device, according to various embodiments.

FIG. 3 is a block diagram 300 illustrating a portion of an example program that may be included in a memory of an electronic device, according to various embodiments. FIG. 4 is a flowchart 400 illustrating an example operation of an electronic device, according to various embodiments. FIG. 5 is a diagram 500 illustrating an example screen of a display panel of an electronic device, according to various embodiments; FIG. 6 is a graph 600 mapping a luminance value of a screen of an electronic device to a code value, according to various embodiments. FIG. 7 is a table 700 illustrating an example maximum decrement for each screen code value for setting luminance of a screen of an electronic device, according to various embodiments. FIG. 8 is graph 800 illustrating example power consumption when executing a process to control luminance of a screen of an electronic device, according to various embodiments.

Referring to FIGS. 3 and 4, an electronic device (e.g., the electronic device 101 of FIG. 1) may include an activity manager 231, a codec manager 233, a display solution manager 235, and a power manager 209, each of which may include, for example, various executable program elements and which may be included in the middleware 144 stored in a memory (e.g., the memory 130 of FIG. 1). The electronic device (e.g., the electronic device 101 of FIG. 1) may also include a display driver 241 which may include, for example, various executable program elements and may be included in an operating system 142 stored in the memory (e.g., the memory 130 of FIG. 1).

A processor (e.g., the processor 120 of FIG. 1) of the electronic device (e.g., the electronic device 101 of FIG. 1) may include various processing circuitry and call at least one of one or more instructions, which are stored in the activity manager 231, the codec manager 233, the display solution manager 235, the power manager 209, and the display driver 241, from the memory (e.g., the memory 130 of FIG. 1), and may execute the called instruction. Hereinafter, the description of the instructions stored in programs will be described together with the description of an example operation of the electronic device.

The electronic device may determine whether a screen-off condition for turning off the screen of the electronic device is satisfied. The electronic device may turn off the screen when a specific condition is satisfied by the settings of the electronic device or the setting by a user. According to an embodiment, the screen is dimmed when a first time is elapsed without an input of the user, and turned off when a second time is elapsed without the input of the user, so the electronic device enters a locking state. According to an embodiment, the electronic device may display a display setting menu for receiving a setting input for the display of the electronic device. The display setting menu may include, for example, a 'screen auto-off time', and the screen-off condition of the electronic device may correspond to a setting value of the 'screen auto-off time'.

The instructions for determining whether the screen-off condition of the electronic device may be stored in the display solution manager 235, and the processor of the electronic device may determine whether the screen-off condition of the electronic device is satisfied, through the display solution manager 235.

When the screen-off condition of the electronic device is satisfied, the processor may perform a control operation to transmit a screen-off instruction from the display solution manager 235 to the power manager 209, and may perform a control operation to transmit, to the display driver 241, an instruction for the power manager 709 to set a screen luminance value to '0'.

The electronic device may determine whether the screen of the electronic device is maintained in a turned on state, even though the screen-off condition of the electronic device is satisfied (401). According to an embodiment, an application (e.g., the application 146 of FIG. 2) running on the electronic device may request the power manager 209 of the electronic device to maintain the screen in a turned on state. According to an embodiment, an application (e.g., a moving picture reproducing application, a game application, or a browser application), which may request that the screen is maintained in a turned on state, may transmit, to the power manager 209, a wake lock request to maintain the screen in a turned on state. Accordingly, the power manager 209 may perform a control operation such that the screen of the electronic device is maintained in a turned on state, even though the screen-off condition of the electronic device is satisfied.

The electronic device may determine whether a specific time 'a' is elapsed while the screen of the electronic device is maintained in a turned on state, even though the screen-off condition of the electronic device is satisfied (402). According to an embodiment, the specific time 'a' may be determined through the setting of the electronic device. For example, and without limitation, the specific time 'a' may be 10 minutes.

The electronic device may determine whether a first screen code value is greater than a specific value 'b', when the specific time 'a' is elapsed while the screen of the electronic device is maintained in a turned on state, even though the screen-off condition of the electronic device is satisfied (403).

The first screen code value will be described with reference to FIGS. 5 and 7. According to an embodiment, a screen 501 of the display panel of the electronic device may display a bar (a luminance adjusting bar) 502 for controlling the luminance of the screen 501. The luminance adjusting bar 502 may correspond to a first screen code. According to an embodiment, the first screen code may, for example, have a value in the range of 0 to 255, a left end of the luminance adjusting bar 502 may correspond to the first screen code value of '0', and a code value may be increased toward the right side, so the right end of the luminance adjusting bar 502 may correspond to the first screen code value of '255'. When a user 10 moves a cursor 503 of the luminance adjusting bar 502, the display solution manger 235 may transmit, to the power manager 209, the first screen code value (e.g., '128') corresponding to the cursor 503. The power manager 209 may identify a luminance value (a screen luminance value) (e.g., 298 nit) of the screen, which corresponds to the first screen code value (e.g., 128), using the graph of FIG. 6 which is obtained by mapping a screen code value to the luminance value (nit) of the screen. The power manager 209 may transmit the identified screen luminance value (e.g., 298 nit) to the display driver 241, and the display driver 241 may change the luminance of the screen to be the identified screen luminance value (e.g., 298 nit). In other words, the user 10 may change the luminance value of the screen by moving the cursor 503 of the luminance adjusting bar 502 to correspond to the first screen code. The graph of FIG. 6 is provided for illustrative purposes, and it will be understood that the manner of mapping the code value to the luminance value of the real screen and the unit representing the luminance value of the screen are not limited to that illustrated in FIG. 6.

Referring to FIGS. 3 and 4, the electronic device may determine whether the first screen code value is greater than the specific value 'b', when the specific time 'a' is elapsed while the screen of the electronic device is maintained turned on, even though the screen-off condition of the electronic device is satisfied (403). According to an embodiment, the specific value 'b' may be determined based on a code value, at which a luminance change becomes meaningless as the screen has no luminance change or is not identified with naked eyes of the user, when the first screen code value is decreased to be equal to or less than the specific value 'b'. According to an embodiment, the specific value 'b' may, for example, be '122'. When the first screen code value is equal to or less than the specific value 'b', the process may be terminated without controlling the screen luminance value.

When the first screen code value is greater than the specific value 'b' ("Yes" in operation 403), the electronic device may set, as a second screen code value, a code value obtained by decreasing the first screen code value by a decrement (404). In this case, the minimum decrement may, for example, and without limitation, be 1%. The second screen code value is not a value identified and changed by a user through the luminance adjusting bar 502, which is different form the first screen code value, but may be a value used to control the luminance of the screen of the electronic device, which is similar to the first screen code value. According to an embodiment, the second screen code value may be a value used to control the luminance of the screen, when the screen of the electronic device is maintained in a turned on state, even though the screen-off condition of the electronic device is satisfied. The first screen code value and the second screen code value may be independent from each other, and the first screen code value may be maintained even if the second screen code value is changed.

When an initial value of the first screen code value is, for example, '230', the electronic device may set, as the second screen code value, a code value of, for example, '227.7' which is obtained by decreasing the first screen code value of '230' by 1%. The display solution manager 235 may transmit, to the power manager 209, the set second screen code value of '227.7'. The power manager 209 may identify the luminance value of the screen, which corresponds to the second screen code value of '227.7', using the graph of FIG. 6. The power manager 209 may transmit the identified luminance value of the screen to the display driver 241, and the display driver 241 may reduce the luminance of the screen to be the identified luminance value of the screen. Although the second screen code value is changed to '227.7', the first screen code value may be maintained to be '230'.

The electronic device may determine whether the decrement is less than the maximum decrement 'C' (406), when a specific time (e.g., 1 min) is elapsed (405) after changing the luminance value of the screen to correspond to the second screen code value.

Hereinafter, the maximum decrement 'C' will be described with reference to FIG. 7. The first screen code value may have various maximum decrements 'C' depending on ranges. When the first screen code value corresponds to the value in the range of 110 to 118, the maximum decrement 'C' may, for example, be 10%. When the first screen code value corresponds to the value in the range of 119 to 133, the maximum decrement may, for example, be 15%. When the first screen code value corresponds to the value in the range of 134 to 255, the maximum decrement 'C' may, for example, be 20%. The maximum decrement may refer, for example, to the maximum value to reduce the luminance of the screen, when the screen of the electronic device is maintained turned on, even though the screen-off condition of the electronic device is satisfied. The mapping table of FIG. 7 for the maximum decrement 'C' based on each screen code value is provided for illustrative purposes, and is not limited to that of FIG. 7. In other words, modifications are possible depending on embodiments.

Referring back to FIGS. 3, 4, and 7, the electronic device may determine whether the decrement is less than the maximum decrement 'C' (406). The electronic device may terminate the process without controlling the luminance of the screen when determining that the decrement is greater than or equal to the maximum decrement 'C' ("No" in operation 406).

On the assumption that the first screen code value is '230', the electronic device may identify that the maximum decrement 'C' is 20% based on a table 700 of FIG. 7. The initial decrement is 1%, so the electronic device may determine that the decrement is less than the maximum decrement 'C' of 20%.

The electronic device may determine whether an application running on the electronic device is switched, or whether a hardware codec is used, when it is determined that the decrement is less than the maximum decrement 'C' (407).

When the application running on the electronic device is switched, the luminance of the screen needs to be controlled depending on the switched application. Accordingly, the process to control the luminance of the screen depending on the application before the switching may be terminated. According to an embodiment, when the application running on the electronic device is switched may be when another application is running, or when an input for a home key of the electronic device is received. The activity manager 231 may broadcast information on the switching of the application when the application is switched, and the display solution manager 235 may receive the information on the switching of the application to identify the switching of the application.

Alternatively, when the hardware codec of the electronic device is being used, it is determined that a moving picture is being reproduced on the application. Accordingly, the luminance of the scree needs to be maintained, so the process to control the luminance of the screen may be terminated. According to an embodiment, the display solution manager 235 may request a response as to whether the hardware codec is being used, to the codec manager 233. The codec manager 233 may transmit, to the display solution manager 235, whether the hardware codec is used, in response to the request.

The electronic device may increase the decrement by 1% (408) and may repeat the process from operation 404, when the application running on the electronic device is not switched and the hardware codec is not used. According to an embodiment, the initial decrement is 1%, so the decrement is increased by 1% to become 2%, and the electronic device may update the second screen code value to the code value of '225.4' which is obtained by decreasing the first screen code value of '230' by 2%.

The display solution manager 235 may transmit, to the power manager 209, the updated second screen code value of '225.4'. The power manager 209 may identify the luminance value of the screen, which corresponds to the second screen code value of '225.4', using the graph of FIG. 6. The power manager 209 may transmit the identified luminance value of the screen to the display driver 241, and the display driver 241 may change the luminance of the screen to be the identified luminance value of the screen. Although the second screen code value is changed to '225.4', the first screen code value may be maintained to be '230'.

The electronic device may update the second screen code value by applying a decrement, which is increased by 1%, to the first screen code value, whenever a specific time (e.g., 1 min) is elapsed after changing the luminance value of the screen to correspond to the second screen code value. According to an embodiment, the electronic device may sequentially update the second screen code value to values of '227.7', '225.4', '223.1', '220.8', . . . , and '184' which are obtained by decreasing the first screen code value of '210' by 1%, 2%, 3%, 4%, . . . , and 20%, whenever the specific time (e.g., 1 min) is elapsed. Whenever the second screen code value is sequentially updated to values of '227.7', '225.4', '223.1', '220.8', . . . , and '184', the luminance of the screen may be gradually decreased.

According to an embodiment, the electronic device does not update the second screen code value anymore and may terminate the process to control the luminance of the screen, when the decrement is 21%, which becomes greater than the maximum decrement 'C' of 20% as 21 minutes are elapsed. Alternatively, the electronic device does not update the second screen code value anymore and may terminate the process to control the luminance of the screen, when the application running on the electronic device is switched or the hardware codec is used in the electronic device, even if the decrement is not greater than the maximum decrement 'C'.

The flowchart of FIG. 4 is provided for illustrative purposes, and some operations may be omitted or some sequences may be changed depending on embodiments.

Although the embodiment has been described on the assumption that the specific time in operation 405 is one minute, the specific time may be variously changed to one minute 30 seconds, two minutes, and five minutes depending on embodiments. According to an embodiment, when the specific time in operation 405 is two minutes, the decrement may be decreased by 1% every two minutes.

Although the embodiment has been described on the assumption that the decrement is 1%, the decrement may be variously increased by 2% or 3% depending on various embodiments. According to an embodiment, on assumption that the specific time is two minutes and the decrement is increased 2%, the decrement may be increased by 2% every two minutes.

Example effects according to the embodiment described above will be described with reference to FIG. 8.

Referring to FIG. 8, according to an embodiment, when the screen-off condition is that 10 minutes is elapsed without the input of the user, and when the specific time 'a' is 10 minutes, the electronic device may have power consumption substantially constant for 20 minutes which is the sum of 10 minutes, which corresponds to the screen-off condition, and 10 minutes which is the specific time 'a' to maintain the screen in a turned on state while satisfying the screen-off condition.

When 20 minutes are elapsed, the electronic device may perform the process to control the luminance of the screen. On the assumption that the application is not switched or the hardware codec is not used, the electronic device may gradually reduce the luminance of the screen for 20 minutes before the decrement is increased by 1% to be greater than the maximum decrement 'C' of 20%. Accordingly, the power consumption of the electronic device may be gradually reduced for the duration of 20 minutes to 40 minutes.

After the decrement is increased to be greater than the maximum decrement 'C' of 20%, the luminance of the screen may not be updated. Accordingly, the power consumption of the electronic device may be maintained to be substantially constant for the duration after 40 minutes.

According to various embodiments of the disclosure, the electronic device may gradually decrease the luminance of the screen under a specific condition, even when the screen of the electronic device is maintained turned on depending on the request of the application, even though the screen-off condition of the electronic device is satisfied. Therefore, power consumption may be reduced, the eyesight of the user may be protected, and the burn-in of the display may be prevented. In addition, such luminance of the screen may be gradually or substantially linearly performed, so the power consumption of the electronic device may be prevented, while the user does not feel uncomfortable with respect to the change in luminance of the screen.

Example operation of the electronic device according to an embodiment will be described with reference to FIG. 9.

Figure 9:
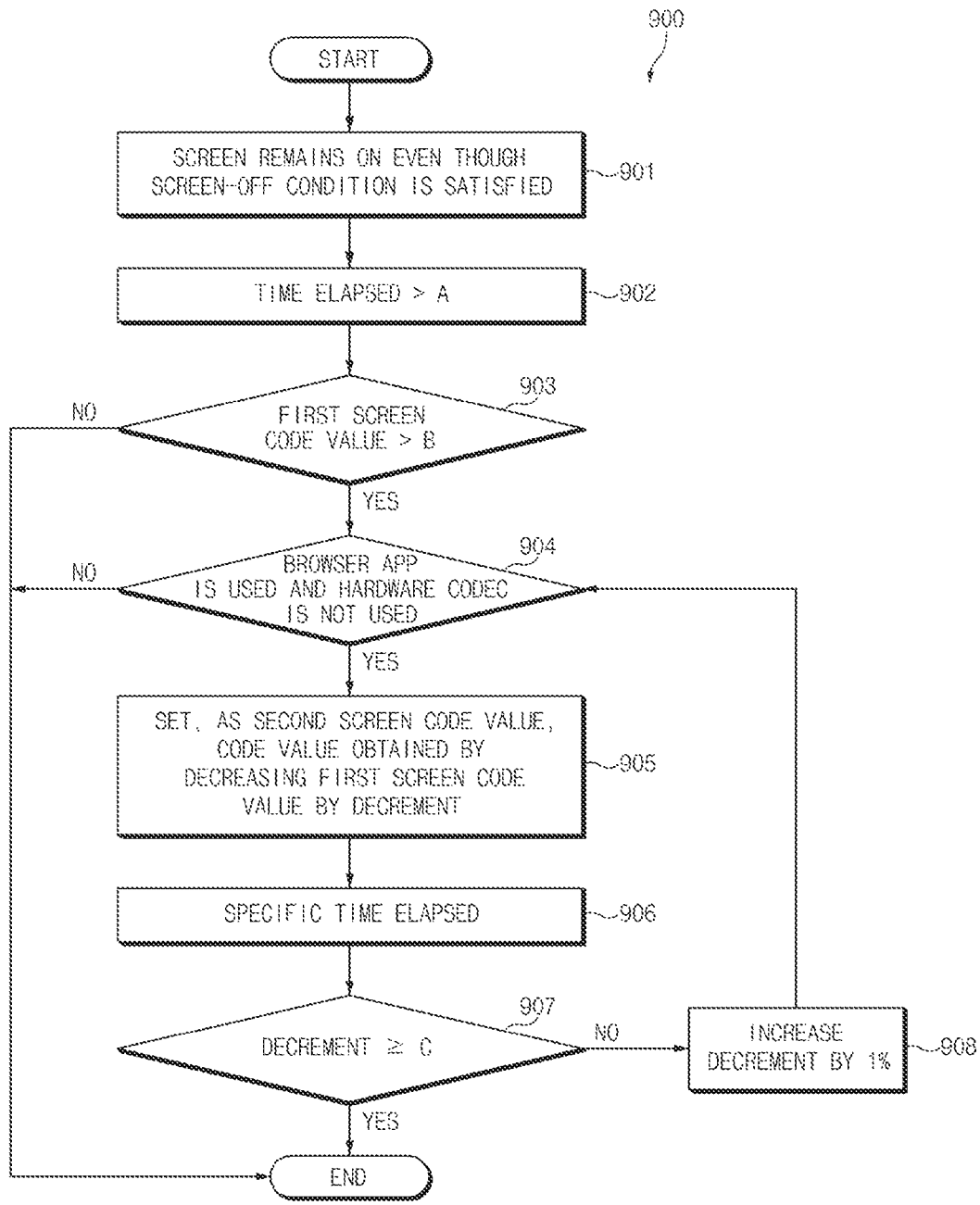
FIG. 9 is a flowchart illustrating an example operation of an electronic device, according to various embodiments.

FIG. 9 is a flowchart 900 illustrating an example operation of an electronic device, according to various embodiments. The repeated duplication of the configuration and the operation the same as those described above may not be repeated here.

Referring to FIG. 9, the electronic device may determine whether the screen of the electronic device is maintained in a turned on state, even though the screen-off condition of the electronic device is satisfied (901).

The electronic device may determine whether a specific time 'a' is elapsed while the screen of the electronic device is maintained turned on, even though the screen-off condition of the electronic device is satisfied (902).

The electronic device may determine whether the first screen code value is greater than the specific value 'b', when the specific time 'a' is elapsed while the screen of the electronic device is maintained turned on, even though the screen-off condition of the electronic device is satisfied (903).

When the first screen code value is greater than the specific value 'b' ("Yes" in operation 903), the electronic device may determine whether the browser application (e.g., the browser application 259 of FIG. 2) is used and whether the hardware codec is used in the electronic device (904). When the browser application is executed, the activity manager 231 may broadcast that the browser application is executed. The display solution manager 235 may receive the broadcast and may identify that the browser application is executed.

The electronic device may terminate the process to control the luminance of the screen by determining that the moving picture is reproduced on the browser application, when determining that the browser application is executed and the hardware codec is used in the electronic device.

The electronic device may determine that the moving picture is not reproduced in the browser application, when determining that the browser application is executed and the hardware codec is not used in the electronic device. The electronic device may set, as the second screen code value, a code value obtained by decreasing the first screen code value by the decrement, by determining that the browser application is executed while the hardware codec is not used in the electronic device (905).

The electronic device may determine whether the decrement is greater than or equal to the maximum decrement 'C' (907), when a specific time (e.g., 1 min) is elapsed (906) after changing the luminance value of the screen to correspond to the second screen code value. When the decrement is less than the maximum decrement 'C' ("No" lay operation 907), the electronic device may increase the decrement by 1% (908), return to operation 904, and repeat the process from operation 904.

The flowchart of FIG. 9 is provided for illustrative purposes, and some operations may be omitted or sequences may be changed depending on embodiments.

Example operation of the electronic device according to an embodiment will be described with reference to FIG. 10.

Figure 10:
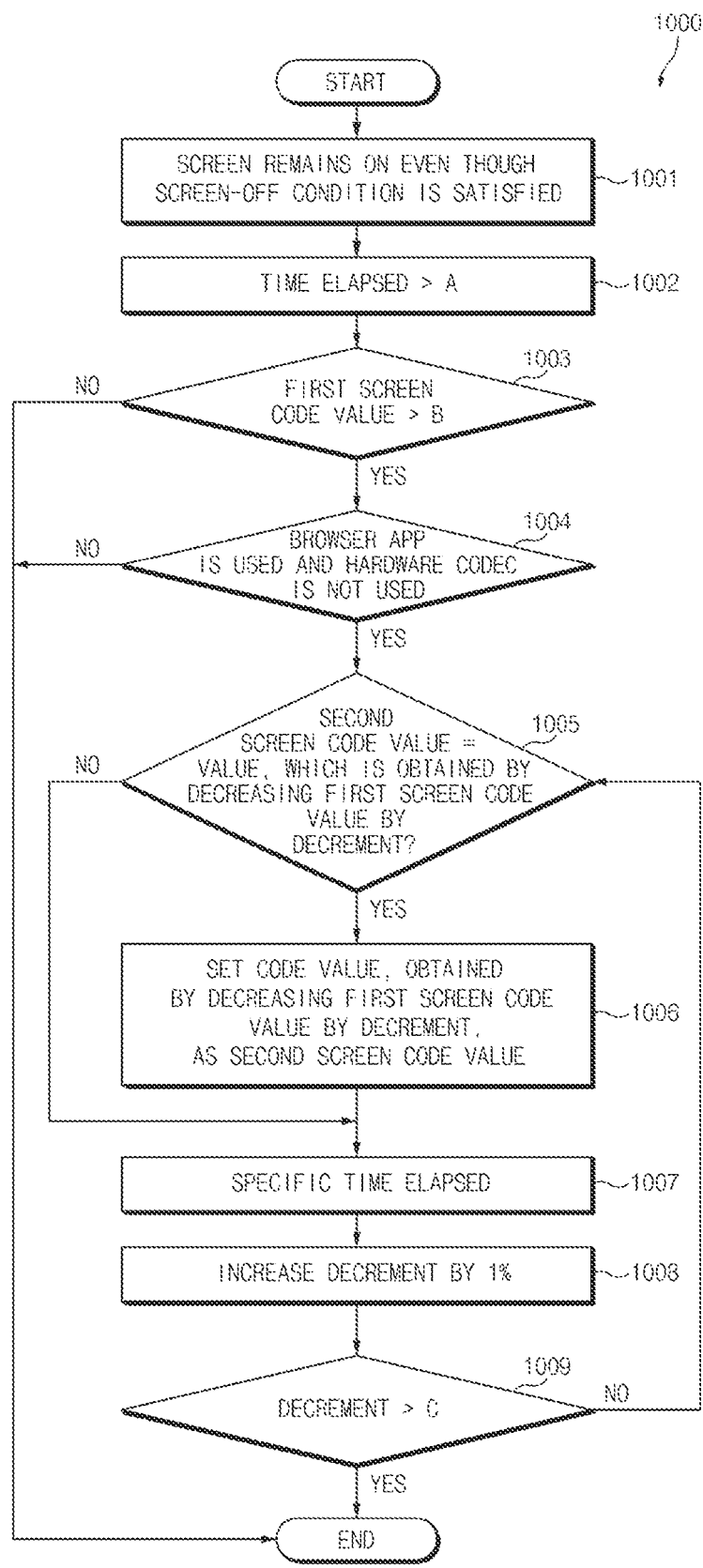
FIG. 10 is a flowchart illustrating an example operation of an electronic device, according to various embodiments.

FIG. 10 is a flowchart 1000 illustrating an example operation of an electronic device, according to various embodiments. The repeated duplication of the configuration and the operation the same as those described above may not be repeated here.

In an embodiment of FIG. 10, before determining whether the screen of the electronic device is turned on even though the screen-off condition of the electronic device is satisfied (1001), it is assumed that the second screen code value is adjusted to be less than the first screen code value depending on another application or a specific condition executed in eh electronic device. According to an embodiment, it is assumed that the first screen code value is set to '230', and the second screen code value is set to 213.9' which is obtained by decreasing the first screen code value by 7%.

Referring to FIG. 10, the electronic device may determine whether the screen of the electronic device is maintained turned on, even though the screen-off condition of the electronic device is satisfied (1001).

The electronic device may determine whether a specific time 'a' is elapsed while the screen of the electronic device is maintained turned on, when the screen of the electronic device is turned on even though the screen-off condition of the electronic device is satisfied (1002).

The electronic device may determine whether a first screen code value is greater than a specific value 'b', when the specific time 'a' is elapsed while the screen of the electronic device is maintained turned on, even though the screen-off condition of the electronic device is satisfied (1003).

When the first screen code value is greater than the specific value 'b' ("Yes" in operation 1003), the electronic device may determine whether the browser application (e.g., the browser application 259 of FIG. 2) is used in the electronic device and whether the hardware codec is not used (1004).

The electronic device may determine whether a value, which is obtained by decreasing the first screen code value by the decrement, is equal to the second screen code value, when the browser application is used in the electronic device and the hardware codec is not used (1005). The minimum decrement may be 0%. According to an embodiment, it is assumed that the first screen code value is set to '230', and the second screen code value is set to '213.9' obtained by decreasing the first screen code value by 7%. Accordingly, the electronic device elapses a specific time (e.g., 1 minute) without updating the second screen code value (1007).

The electronic device may increase the decrement by 1% when the specific time (e.g., 1 minute is elapsed (1008), and may determine whether the decrement is greater than the maximum decrement 'C' (1009). According to an embodiment, the electronic device may determine whether the decrement is less than the maximum decrement 'C', because the decrement is increased by 1% from the minimum decrement of 0% to become 1% and the maximum decrement 'C' becomes 20% as the first screen code value is 230.

The electronic device may return to operation 1005 and may repeat the process from operation 1005 by determining that the decrement is less than the maximum decrement 'C'. According to an embodiment, when the decrement is increased by 1% every specific time (e.g., 1 minute) to be 7%, the electronic device may determine that the code value of '213.9', which is obtained by decreasing the first screen code value of '230' by 7%, is equal to the second screen code value of '213.9'.

When determining that the code value obtained by decreasing the first screen code value by decrement is equal to the second screen code value (1005), the electronic device may set the code value, obtained by decreasing the first screen code value by decrement, as the second screen code value (1006). When the luminance of the screen is changed to correspond to the second screen code value, which is set, and the specific time (e.g., 1 minute) is elapsed (1007), the electronic device may increase the decrement by 1% (1008) and may determine whether the decrement is greater than the maximum decrement 'C' (1009). When the decrement is less than or equal to the maximum decrement 'C', the electronic device returns operation 1005 and repeats the process operation 1005 until the decrement is greater than the maximum decrement 'C'.

The flowchart of FIG. 10 is provided for illustrative purposes, and some operations may be omitted or sequences may be changed depending on embodiments.

According to an example embodiment of the disclosure, an electronic device includes: a display device, a processor operatively connected to the display device, and a memory operatively connected with the processor. The memory stores one or more instructions that when executed, cause the processor to: determine, as a second screen code value, a code value obtained by reducing a first screen code value corresponding to a luminance value of a screen of the display device, by a decrement based on the screen being maintained in a turned on state during a first specific time after a screen-off condition of the display device is satisfied, and change the luminance value of the screen to correspond to the determined second screen code value.

The memory may further store one or more instructions that when executed, cause the processor to change the decrement to increase the decrement until the decrement is equal to a specific value, and update the second screen code value to a code value obtained by decreasing the first screen code value by the changed decrement, based on the decrement being changed.

The memory may further store one or more instructions that when executed, cause the processor to maintain the first screen code value based on the luminance value of the screen being updated based on the second screen code value.

The memory may further store one or more instructions that when executed, cause the processor to determine the specific value based on the first screen code value.

The condition of turning off the screen may include a second specific time elapsing without an input of a user.

The memory may further store one or more instructions that when executed, cause the processor to determine, as the changed decrement, a value obtained by increasing the decrement to be proportional to a time elapsed after changing the luminance value of the screen to correspond to the updated second screen code value.

The memory may further store one or more instructions that when executed, cause the processor to determine, as the changed decrement, a value obtained by increasing the decrement by 1%, based on a third specific time being elapsed after changing the luminance value of the screen to correspond to the updated second screen code value.

The memory may further store one or more instructions that when executed, cause the processor to determine whether a browser application is executed before updating the second screen code value.

The memory may further store one or more instructions that when executed, cause the processor to determine whether a hardware codec is used, based on a browser application being executed.

The memory may further store one or more instructions that when executed, cause the processor to: increase the decrement without updating the second screen code value until the code value obtained by reducing the first screen code value by the decrement is equal to the second screen code value based on the first screen code value being different from the second screen code value at a time point at which the screen is maintained in a turned on state during the first specific time after the screen-off condition is satisfied.

According to an example embodiment of the disclosure, a method for controlling luminance of a screen of an electronic device includes: determining, as a second screen code value, a code value obtained by reducing a first screen code value corresponding to a luminance value of a screen by a decrement based on the screen being maintained in a turned on state during a first specific time after a screen-off condition is satisfied, and changing the luminance value of the screen to correspond to the determined second screen code value.

The decrement may be changed to increase the decrement until the decrement is equal to a specific value, and the second screen code value may be updated based on a code value obtained by decreasing the first screen code value by the changed decrement based on the decrement being changed.

The first screen code value may be maintained based on the luminance value of the screen being updated based on the second screen code value.

The specific value may be determined based on the first screen code value.

The screen-off condition may include a second specific time elapsing without an input of a user.

A value obtained by increasing the decrement to be proportional to a time elapsed after changing the luminance value of the screen to correspond to the updated second screen code value, may be determined as the changed decrement.

A value obtained by increasing the decrement by 1%, based on a third specific time being elapsed after changing the luminance value of the screen to correspond to the updated second screen code value, may be determined as the changed decrement.

It may be determined whether a browser application is executed before updating the second screen code value.

It may be further determined whether a hardware codec is used, based on the browser application being executed.

The decrement may be increased without updating the second screen code value until the code value obtained by reducing the first screen code value by the decrement is equal to the second screen code value, based on the first screen code value being different from the second screen code value at a time point at which the screen is maintained in a turned on state during the first specific time after the screen-off condition is satisfied.

According to various example embodiments of the disclosure, the electronic device may be provided to reduce the power consumption of the electronic device, to prevent the burn-in of the display, and to protect the eyesight of the user, by controlling the luminance of the screen, even though the electronic device maintains the screen in a turned on state, in response to the request of the application running on the electronic device.

A variety of effects directly or indirectly understood through the disclosure may be provided.

While the disclosure has been illustrated and described with reference to various example embodiments thereof, it will be understood that the various example embodiments are intended to be illustrative, not limiting. It will be further understood by those skilled in the art that various changes in form and detail may be made without departing from the true spirit and full scope of the disclosure, including the appended claims and their equivalents.

What is claimed is:

1. An electronic device comprising:
   a display;
   a processor; and
   a memory,
   wherein the memory stores one or more instructions configured to, when executed, cause the processor to:
      after a condition to turn off the display is satisfied, based on a determination that a turned on state of the display is maintained for a first predetermined time, determine a second value associated with a luminance of the display by decreasing a first value associated with the luminance of the display via a decrement value, wherein the first value corresponds to a predetermined luminance value in the turned on state of the display; and
      change the luminance of the display based on the determined second value.

2. The electronic device of claim 1, wherein the memory further stores one or more instructions configured to, when executed, cause the processor to:
   change the decrement value to increase steadily until the decrement value is equal to a specific value; and
   upon the decrement value being changed, update the second value to a value obtained by decreasing the first value by the changed decrement value.

3. The electronic device of claim 2, wherein the memory further stores one or more instructions configured to, when executed, cause the processor to:
   determine the specific value based on the first value.

4. The electronic device of claim 2, wherein the memory further stores one or more instructions configured to, when executed, cause the processor to:
   determine, as the changed decrement value, a value obtained by increasing the decrement value to be proportional to a time elapsed after changing the luminance of the display to correspond to the updated second value.

5. The electronic device of claim 2, wherein the memory further stores one or more instructions configured to, when executed, cause the processor to:
   increase the decrement value without updating the second value until the value obtained by reducing the first value by the decrement value, is equal to the second value, based on the first value being different from the second value at a time point at which the display is maintained in the turned on state during the first predetermined time after the condition is satisfied.

6. The electronic device of claim 1, wherein the condition comprises a second predetermined time elapsing without a user input in the turned on state of the display.

7. The electronic device of claim 1, wherein the memory further stores one or more instructions configured to, when executed, cause the processor to:
   determine whether a predetermined application is executed before changing the luminance of the display, and
   maintain the luminance of the display based on the determination that the predetermined application is executed.

8. The electronic device of claim 1, wherein the memory further stores one or more instructions configured to, when executed, cause the processor to:
   determine whether a hardware codec is used, and
   maintain the luminance of the display based on the determination that the hardware codec is executed.

9. A method for controlling luminance of a display of an electronic device, the method comprising:
   after a condition to turn off the display is satisfied, according to a determination that a turned on state of the display is maintained for a first predetermined time, determining a second value by decreasing a first value by a decrement value, wherein the first value corresponds to a predetermined luminance value in the turned on state of the display; and
   changing the luminance of the display based on the determined second value.

10. The method of claim 9, further comprising:
    changing the decrement value to increase steadily until the decrement value is equal to a specific value; and
    when the decrement value is being changed, updating the second value based on a value obtained by decreasing the first value by the changed decrement value.

11. The method of claim 10, further comprising:
    determining the specific value based on the first value.

12. The method of claim 10, further comprising:
    determining, as the changed decrement value, a value obtained by increasing the decrement value to be proportional to a time elapsed after changing the luminance of the display to correspond to the updated second value.

13. The method of claim 10, further comprising:
    increasing the decrement value without updating the second value until the value obtained by reducing the first value by the decrement value, is equal to the second value based on the first value being different from the second value at a time point at which the display is maintained in the turned on state during the first predetermined time after the condition is satisfied.

14. The method of claim 9, wherein the condition includes a second predetermined time elapsing without a user input in the turned on state of the display.

15. The method of claim 9, further comprising:
    determining whether a predetermined application is executed before changing the luminance of the display; and
    maintaining the luminance of the display based on the determination that the predetermined application is executed.

16. The method of claim 9, further comprising:
    determining whether a hardware codec is used before changing the luminance of the display; and
    maintaining the luminance of the display based on the determination that the hardware codec is used.

17. A non-transitory computer-readable storage medium storing a program, wherein, when executed by a processor of an electronic device, the program is configured to cause the electronic device to:

after a condition to turn off a display of the electronic device is satisfied, according to a determination that a turned on state of the display is maintained for a first predetermined time, determine a second value associated with a luminance of the display by decreasing a first value associated with the luminance of the display by a decrement value, wherein the first value corresponds to a predetermined luminance value in the turned on state of the display; and change the luminance of the display based on the determined second value.

18. The storage medium of claim 17, wherein the program is further configured to cause the electronic device to:

change the decrement value to increase steadily until the decrement value is equal to a specific value; and upon the decrement value being changed, update the second value to a value obtained by decreasing the first value by the changed decrement value.

19. The storage medium of claim 18, wherein the program is further configured to cause the electronic device to:
determine the specific value based on the first value.

20. The storage medium of claim 17, wherein the program is further configured to cause the electronic device to:

before changing the luminance of the display, determine whether a predetermined application is executed or a hardware codec is used, and maintain the luminance of the display based on the determination that the predetermined application is executed or the hardware codec is used.

* * * * *